United States Patent Office 2,918,833
Patented Dec. 29, 1959

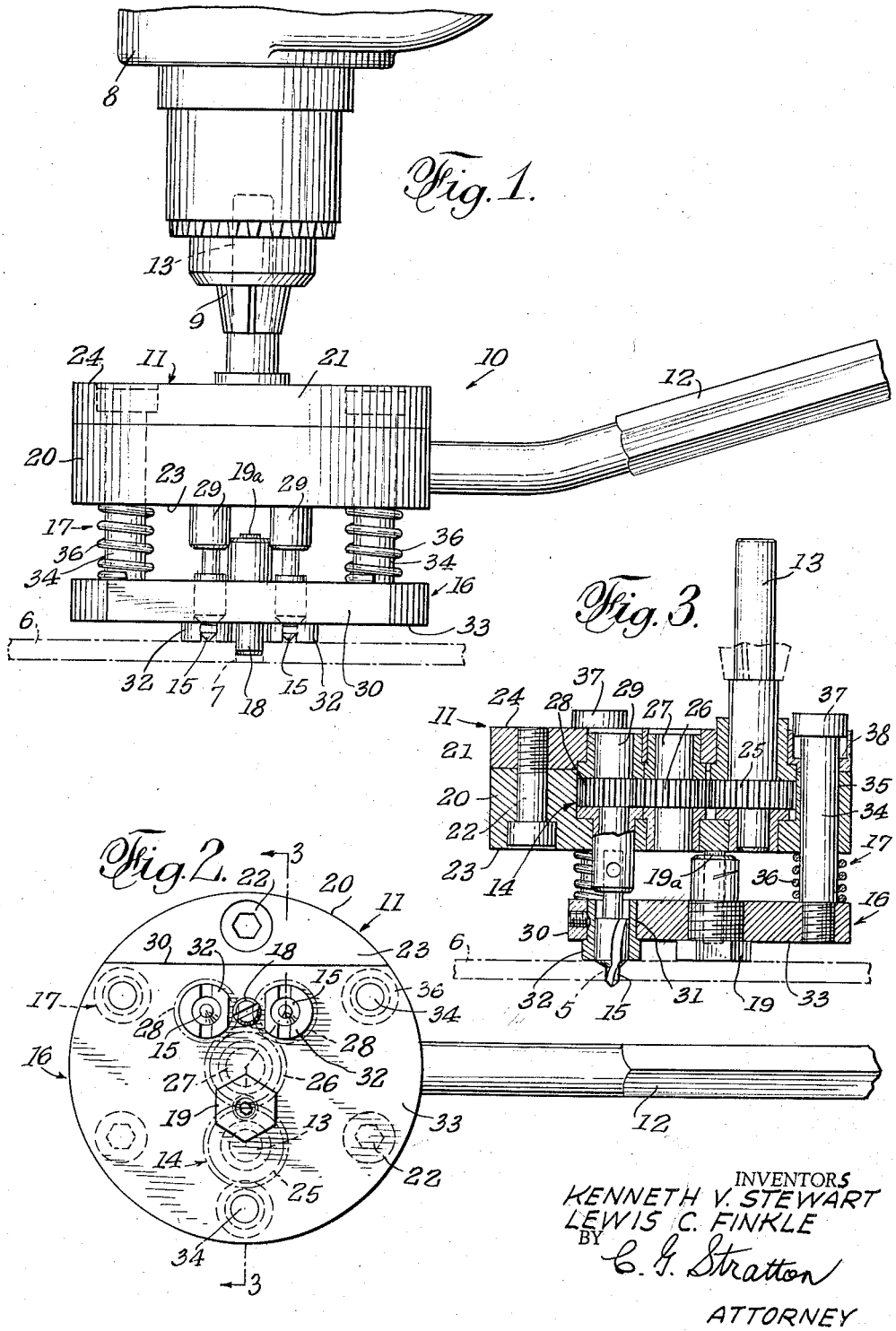

2,918,833
DRILLING TOOL

Kenneth V. Stewart, Van Nuys, and Lewis C. Finkle, Temple City, Calif., assignors to Manufacturers Development, El Monte, Calif., a corporation of California Application October 6, 1958, Serial No. 765,427

5 Claims. (Cl. 77—22)

This invention relates to a tool for drilling holes in relation to a hole already provided and has for an object to provide a tool that may be operated with easy facility by a hand power drill or similar manually controlled device.

Another object of the invention is to provide a tool of the character referred to that enables visual orientation of a plurality of hole-forming elements, whereby said tool, using a pre-formed hole as a locating means, may drill properly oriented holes auxiliary to the preformed hole.

Another object of the invention is to provide a drilling tool in which a plurality of drill elements are in continuous rotation, as controlled by a hand drill to which the tool is connected, and feed of the drill elements is manually effected relative to fixed orienting means manually controlled independently of the control of the drill.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, one embodiment of the present invention, which is given by way of illustration or example only.

In the drawing, like reference characters designate similar parts in the several views.

Fig. 1 is a side elevational view of a tool according to the present invention and shown connected to a conventional hand power drill.

Fig. 2 is a plan view as seen from the bottom of Fig. 1.

Fig. 3 is a cross-sectional view as taken on the plane of line 3—3 of Fig. 2 with the tool in drilling position.

The present tool is devised for drilling one or more flanking holes 5 in a plate 6 in oriented relation to a hole 7 already provided in said plate. Thus, the present tool may be advantageously employed as an anchor nut drill unit, and for similar hole-drilling purposes.

The drawing shows a hand power drill 8 that, in the usual manner, is provided with a chuck 9 ordinarily used for clutching to a drill, bit, or other hole-forming element. The present tool 10 is connected to the hand drill 8 to be operated by the rotation of chuck 9.

The present tool 10 comprises, generally, a body 11 provided with a laterally directed handle 12, a spindle 13 extending from the body and adapted to be connected to the chuck 9, as above mentioned, a gear train 14 driven by said spindle 13, preferably two spaced tool elements 15 driven through the gear train by the spindle 13 and in the same direction as said spindle, a pilot and orienting plate 16 disposed in guiding relation to the elements 15, means 17 resiliently biasing said plate 16 to a projected position relative to the body 11, a pilot 18 carried by said plate for engagement in hole 7, and a leveling pad 19 also carried by plate 16 to guide the operating position of the tool relative to the plate 6 so that the tool elements 15 may cut holes 5 into said plate 6 in parallelism to the hole 7, said pad 19 being here shown as carrying an adjustable stop 19a for controlling the depth to which the tool elements cut holes 5.

While plate 6 is shown of a thickness such that tool elements 15 will cut through, it is evident that the holes 5 may be formed as blind holes in a plate 6 that is thicker than the depth to which said elements will cut.

The body 11 is advantageously formed of circular body parts 20 and 21 that are connected as by bolts 22. The top and bottom faces of said body are preferably flat and parallel to each other. The handle 12 comprises a bar that is affixed to the body part 20 and is bent at a slight angle to be directed angularly away from the bottom face 23 of the body.

The spindle 13 extends from the top face 24 of the body, the same having an eccentric position that locates it above halfway between the center of the body and the periphery thereof.

The gear train 14 comprises a driver gear 25 on the spindle 13, an intermediate or idler gear 26 on a stub shaft 27 on the center of the body, and two spaced gears 28 on spindles 29. As shown in Fig. 2, the gear train is arranged symmetrically on a center line through the spindle 13 and shaft 27 with the spindles 29, one on each side of said center line. As a consequence, the two latter spindles have a symmetrical relationship to the chuck 9 of the hand drill 8 regardless of the angular disposition of the body 11 with respect to the chuck axis. It will be noted that the direction of rotation of spindle 13 (usually right hand) and that of the spindles 29 is the same.

The tool elements 15 are carried by the spindles 29 and are here shown as combined drilled and countersinks that are replaceably carried by said spindles and extend therefrom downwardly from the lower face 20 of the body 11. Other tools may be used, such as countersinks, alone.

The pilot and orienting plate 16 is disposed in spaced relation to the face 23 of the tool body. The same is here shown as of the diametral size of the body except that a flat edge 30 is formed on the periphery of the plate, said edge being normal to the mentioned center line on which gears 25 and 26 are disposed. Thus, said edge 30 is parallel to a line that connects the centers of the tool elements 15 and the same constitutes a visual guide that shows the operator of the tool element the direction of the line between the tool centers even though he is unable to see said elements during a drilling and countersinking operation.

The plate 16 is provided with bushings 31 through which said tool elements extend, said bushings being provided with extension collars 32 below the bottom surface 33 of the plate 16. Normally, the tool elements are retracted into bushings 31, as shown in Fig. 1, whereby the tool points are not only protected but, because retracted, the tool may be placed in operative position with the plate 16 or, rather the collars 32, flatwise against the plate 6 to be drilled.

The means 18 is shown as three studs 34 carried by the plate 16 and extending through bores 35 in the tool body 11. Thus said studs guide plate 16 for movement toward and from the body; a compression spring 36 around each stud 34 and between the body 11 and plate 16, biases the latter to a spaced position away from the former, heads 37 on said bolts or studs 34 limiting such spaced position of the plate by engaging seats 38 in the body.

As shown in Fig. 3, upon pressing the collars 32 against the plate 6 in which elements 15 are to drill holes, the springs 36 become compressed and the body 11, under downward pressure applied to the drill 8, moves toward the plate 16. Thus, the tool elements 15 are projected through bushings 31 so they may perform their operation as the drill 8 drives the spindle 13.

The pilot 18 is placed on plate 16 to be between bushings 31, whereby the holes formed by the tool elements 15 are located, accordingly, on either side of the hole 7 into which the pilot is entered preparatory to a drilling operation.

The leveling pad 19 is carried by the plate 16 and cooperates with the bushing collars 32 to provide a three-point means for engaging plate 6 so the tool may be properly applied.

The stop 19a extends through the pad 19 and is directed toward the body face 23. As shown in Fig. 1, said stop is normally spaced from said face, but is engaged therewith, as in Fig. 3, when the body is pressed, as described, to enter the elements 15 into plate 6.

With the hand drill 8 in one hand and the handle 12 in the other, the pilot 18 is entered into hole 7. The operator now can manipulate said handle to align plate edge 30 according to the desired location of the holes to be drilled. Now, with the power on said drill on, the elements 15 rotate on their axes to drill into said plate as the operator presses downward toward plate 6. Upon easing of such pressure and stopping of the rotation of spindle 13, the drill may be moved to the next hole 7 and the operation repeated, as above.

By omitting one tool element 15, one hole may be thus drilled. Of course, the head or body 11 may be varied so as to include more than two elements 15 and the gear train changed, accordingly.

While the foregoing specification illustrates and describes what we now contemplate to be the best mode of carrying out our invention, the construction is, of course, subject to modification without departing from the spirit and scope of our invention. Therefore, we do not desire to restrict the invention to the particular form of construction illustrated and described, but desire to cover all modifications that may fall within the scope of the appended claims.

Having thus described our invention, what we claim and desire to secure by Letters Patent is:

1. A tool comprising a body, hole-drilling elements carried by the body and extending from one face thereof, a spindle extending from the opposite face and adapted to be connected to and be driven by a power hand drill, gearing within the body operatively connecting said elements and spindle, a plate spaced from the face of the body from which the drilling elements extend and provided with bushings guiding said elements, resilient means biasing said plate away from the body, said plate being provided with a flat edge and the resilient means locating the plate so that said edge is oriented relative to the disposition of the drilling elements to constitute a visual guide for the operator as to such disposition of the elements, a pilot on the plate to engage in a hole in a workpiece to be drilled by said elements, and a handle on the body to orient the plate and body around the pilot-occupied hole in the workpiece, the plate-biasing means contracting, upon pressure by the hand drill in a direction toward the workpiece, to project the drilling elements through the plate and into drilling engagement with the workpiece.

2. A tool according to claim 1 in which the drill-connected spindle is on one side of the center of the body and the drill elements and the pilot are on the opposite side, the mentioned handle extending radially from the body along a radial line normal to a diametral line through the spindle, pilot and body center.

3. A tool according to claim 1 in which means separably engaging the body and plate is provided to limit the contraction of the plate-biasing means and the extent to which the drilling elements project through said plate.

4. A tool according to claim 1 in which the workpiece-engaging side of the biased plate is provided with leveling means including, in part, the drilling element guide bushings.

5. A tool according to claim 1 in which the workpiece-engaging side of the biased plate is provided with leveling means including, in part, the drilling element guide bushings, and, in part, a pad spaced from said bushings.

References Cited in the file of this patent
UNITED STATES PATENTS

| | | |
|---|---|---|
| 1,110,455 | Nelson | Sept. 15, 1914 |
| 2,426,124 | Skwierawski | Aug. 19, 1947 |
| 2,492,391 | Minek | Dec. 27, 1949 |
| 2,706,918 | Blatt | Apr. 26, 1955 |